US011418690B2

(12) United States Patent
Tan et al.

(10) Patent No.: US 11,418,690 B2
(45) Date of Patent: Aug. 16, 2022

(54) RETRACTABLE FUNCTIONAL ASSEMBLY, MIDDLE FRAME ASSEMBLY AND TERMINAL DEVICE

(71) Applicant: GUANGDONG EVERWIN PRECISION TECHNOLOGY CO., LTD., Guangdong (CN)

(72) Inventors: Shenggang Tan, Guangdong (CN); Qiuwen Du, Guangdong (CN); Niannian Duan, Guangdong (CN)

(73) Assignee: GUANGDONG EVERWIN PRECISION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/278,056

(22) PCT Filed: Apr. 7, 2020

(86) PCT No.: PCT/CN2020/083474
§ 371 (c)(1),
(2) Date: Mar. 19, 2021

(87) PCT Pub. No.: WO2020/211680
PCT Pub. Date: Oct. 22, 2020

(65) Prior Publication Data
US 2022/0006934 A1  Jan. 6, 2022

(30) Foreign Application Priority Data

Apr. 17, 2019  (CN) .......................... 201910308014.2

(51) Int. Cl.
*H04N 5/225* (2006.01)
*H04M 1/02* (2006.01)

(52) U.S. Cl.
CPC ........ *H04N 5/2257* (2013.01); *H04M 1/0264* (2013.01)

(58) Field of Classification Search
CPC .. H04N 5/2252; H04N 5/2257; H04M 1/0264
(Continued)

(56) References Cited

U.S. PATENT DOCUMENTS

| 11,050,908 B2* | 6/2021 | Zhen ...................... G06F 1/3287 |
| 2005/0168628 A1* | 8/2005 | Wang .................. H04M 1/0214 |
| | | 348/E5.025 |

(Continued)

FOREIGN PATENT DOCUMENTS

| CN | 1869753 A | 11/2006 |
| CN | 202065937 U | 12/2011 |

(Continued)

OTHER PUBLICATIONS

CN 201910308014-2 First Office Action dated Jun. 2, 2020 with Machine English Translation.

(Continued)

*Primary Examiner* — Anthony J Daniels
(74) *Attorney, Agent, or Firm* — W&G Law Group

(57) ABSTRACT

An extending-type functional assembly is mounted on a frame of a smart terminal, and electrically connected to a control unit of the smart terminal. The extending-type functional assembly comprises a body, a camera module, and a driving. The body comprises a rotating end and a free end, the rotating end is rotatably connected to the frame of the smart terminal, and the free end can be rotated into or out of the frame of the smart terminal. The camera module is disposed on the body, and the body can drive the camera module to move. When the free end is rotated out of the frame of the smart terminal, the camera module is exposed from the frame of the smart terminal; when the rotating end is rotated into the frame of the smart terminal, the camera module is hidden in the frame of the smart terminal.

12 Claims, 11 Drawing Sheets

(58) Field of Classification Search
USPC .................................................. 348/373, 376
See application file for complete search history.

(56) References Cited

U.S. PATENT DOCUMENTS

| | | | |
|---|---|---|---|
| 2007/0070189 A1* | 3/2007 | Lee | H04N 7/142 348/E7.079 |
| 2008/0058010 A1* | 3/2008 | Lee | H04M 1/0264 455/566 |
| 2008/0204985 A1 | 8/2008 | Bae et al. | |
| 2014/0364168 A1* | 12/2014 | Galuszka | G06F 1/1613 455/556.1 |
| 2019/0009735 A1* | 1/2019 | Ahn | H04N 5/2252 |
| 2019/0297174 A1* | 9/2019 | Leung | H04N 5/2253 |
| 2020/0177779 A1* | 6/2020 | Tsai | H04N 5/225251 |
| 2020/0236253 A1* | 7/2020 | Zou | G03B 17/04 |
| 2021/0099651 A1* | 4/2021 | Xiang | H04N 5/232939 |
| 2021/0185156 A1* | 6/2021 | Zhu | G06F 1/1686 |
| 2021/0218900 A1* | 7/2021 | Zou | H04N 5/2257 |

FOREIGN PATENT DOCUMENTS

| | | |
|---|---|---|
| CN | 106329059 A | 1/2017 |
| CN | 106790833 A | 5/2017 |
| CN | 106817450 A | 6/2017 |
| CN | 107071242 A | 8/2017 |
| CN | 107343064 A | 11/2017 |
| CN | 107707698 A | 2/2018 |
| CN | 207528241 U | 6/2018 |
| CN | 108508683 A | 9/2018 |
| CN | 109088962 A | 12/2018 |
| CN | 109114231 A | 1/2019 |
| CN | 110049215 A | 7/2019 |

OTHER PUBLICATIONS

International Search Report and Written Opinion from International Application No. PCTCN2020083474 dated Jun. 28, 2020.

* cited by examiner

RETRACTABLE FUNCTIONAL ASSEMBLY, MIDDLE FRAME ASSEMBLY AND TERMINAL DEVICE

CROSS-REFERENCE TO RELATED APPLICATIONS

This patent application is a U.S. national phase of International Application No. PCT/CN2020/083474, filed on Apr. 7, 2020, which claims priority to Chinese Patent Application No. 201910308014.2, filed on Apr. 17, 2019. The disclosures of the aforementioned applications are hereby incorporated by reference in their entireties.

TECHNICAL FIELD

The present disclosure relates to the technical field of electronic devices, and more particularly, to a retractable functional assembly, a middle frame assembly, and a terminal device.

BACKGROUND

With development and progress of mobile terminals, increasing a screen-to-body ratio of a display screen of a mobile terminal has become a main development trend to increase a display size.

In order to achieve a selfie function, a mobile terminal is generally equipped with a front camera. Therefore, a display area of a display screen of the mobile terminal needs to provide a camera shooting window, so that the front camera will occupy the display area of the display screen.

At present, a technical solution to the display area being occupied by the front camera is to form an opening in the display screen. In this case, in a displaying state, there will be a notch at a position of the front camera where displaying cannot be normally performed, thereby destroying overall display effect of the display screen. Therefore, how to increase the screen-to-body ratio of a mobile terminal has been an urgent technical problem in this field.

SUMMARY

In view of above, the present disclosure provides a retractable functional assembly, a middle frame assembly and a terminal device to solve the above-mentioned problems.

A retractable functional assembly is provided, and the retractable functional assembly is configured to be installed to a frame of an intelligent terminal and electrically connected to a control unit of the intelligent terminal. The retractable functional assembly includes a main body, a camera module, and a driving. The main body includes a rotatable end and a free end, the rotatable end is rotatably connected to the frame of the intelligent terminal, and the free end is capable of rotating into or out of the frame of the intelligent terminal. The camera module is provided on the main body and configured to move with the main body. The driving is configured to drive the main body to move. When the driving drives the rotatable end to rotate in such a manner that the free end rotates out of the frame of the intelligent terminal, the camera module is exposed from the frame of the intelligent terminal. When the driving drives the main body to rotate in such a manner that the free end rotates into the frame of the intelligent terminal, the camera module is hidden in the frame of the intelligent terminal.

Another retractable functional assembly is provided, and the retractable functional assembly is configured to be installed to a frame of an intelligent terminal. The retractable functional assembly includes two main bodies, a camera module, a speaker module, and a driving. Each of the main bodies includes a rotatable end and a free end, the rotatable end is rotatably connected to the frame of the intelligent terminal, and the free end is configured to rotate into or out of the frame of the intelligent terminal. The camera module and the speaker module are respectively provided on two main bodies of the two main bodies or both provided on one of the two main bodies. The driving is configured to drive the two main bodies to move synchronously or one of the two main bodies to move independently. When the driving drives the rotatable end of each of the two main bodies or one of the two main bodies to rotate in such a manner that the free end of each of the two main bodies or the one of the two main bodies rotates out of the frame of the intelligent terminal, at least one of the camera module or the speaker module is exposed from the frame of the intelligent terminal. When the driving drives the rotatable end of each of the two main bodies or one of the two main bodies in such manner that the free end of each of the two main bodies or the one of the two main bodies rotates into the frame of the intelligent terminal, the at least one of the camera module or the speaker module is hidden in the frame of the intelligent terminal.

A middle frame assembly is provided, and the middle frame assembly includes the retractable functional assembly as described above. The middle frame assembly includes a frame, and the frame is provided with a receiving groove. The main body of the retractable functional assembly is rotatably installed in the receiving groove.

A terminal device is provided, and the terminal device includes a frame. The frame is rotatably connected to the retractable functional assembly described above.

The advantageous effects of the present disclosure are described as follows. The retractable functional assembly is installed to the frame of the intelligent terminal, and several functional modules are integrated to the main body. In this case, when these functional modules are required for usage, the main body rotates out of the intelligent terminal; and when these functional modules are not required for usage, the main body is received in the intelligent terminal. Therefore, there is no need to install functional modules on the screen, thereby greatly increasing the screen-to-body ratio of the mobile terminal.

Figure 1:
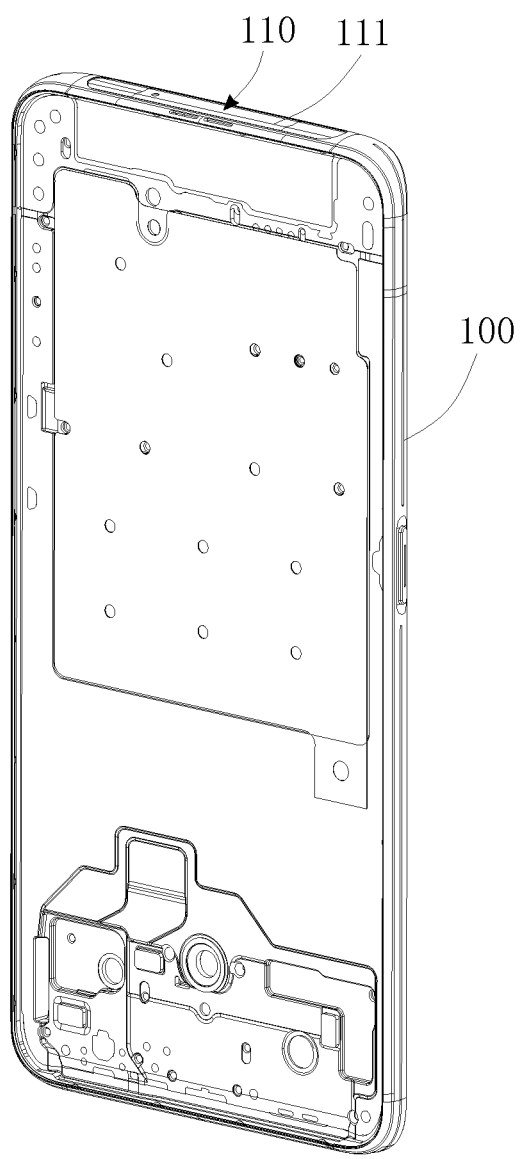
FIG. 1 and FIG. 2 are schematic diagrams illustrating a structure of a retractable functional assembly installed to a frame of an intelligent terminal according to an embodiment of the present disclosure.

Reference signs: 100—frame; 101—receiving groove; 102—guide hole; 110—retractable functional assembly; 111—main body; 1111—free end; 1112—rotatable end; 1113—sliding groove; 120—driving; 121—motor; 122—transmission assembly; 1221—threaded rod; 1222—threaded sleeve; 1223—insert pin; 130—first guide assembly; 131—arc-shaped protruding rod; 132—arc-shaped groove; 140—second guide assembly; 141—limiting pin; 142—limiting slot; 150—elastic rotation shaft; 151—connecting portion; 152—bent portion; 153—protrusion; 160—connecting nail; 170—recess; 180—arc-shaped side; 201—front surface; 202—rear surface; 203—left surface; 204—right surface; 211—front side wall; 212—rear side wall; 213—left side wall; 214—right side wall; 220—supporting block; 230—insertion hole; 240—gap; 250—conductive part; 260—conductive assembly; 270—second conductive member; 271—insertion rod; 272—connecting cap; 273—first clamping portion; 2731—connecting hole; 274—second clamping portion; 275—connecting portion; 280—sink groove; 290—through hole; 291—first working section; and 292—second working section.

DESCRIPTION OF EMBODIMENTS

In order to illustrate the present disclosure, the present disclosure will be described in details in the following with reference to the accompanying drawings. Embodiments of the present disclosure have been illustrated in the drawings. However, the present disclosure can be implemented in various different manners and is not limited to the embodiments described herein. And a purpose of providing these embodiments is to clearly and fully describe the present disclosure.

It should be noted that when an element is referred to as being "fixed to" another element, it may be directly disposed on the other element or there may be an intermediate element therebetween. When an element is considered to as being "connected" to another element, it may be directly connected to the other element or there may be an intermediate element therebetween. In contrast, when an element is referred to as being "directly on" another element, there are no intervening elements therebetween. The terms "vertical", "horizontal", "left", "right", and similar expressions used herein are for illustrative purposes only.

Figure 2:
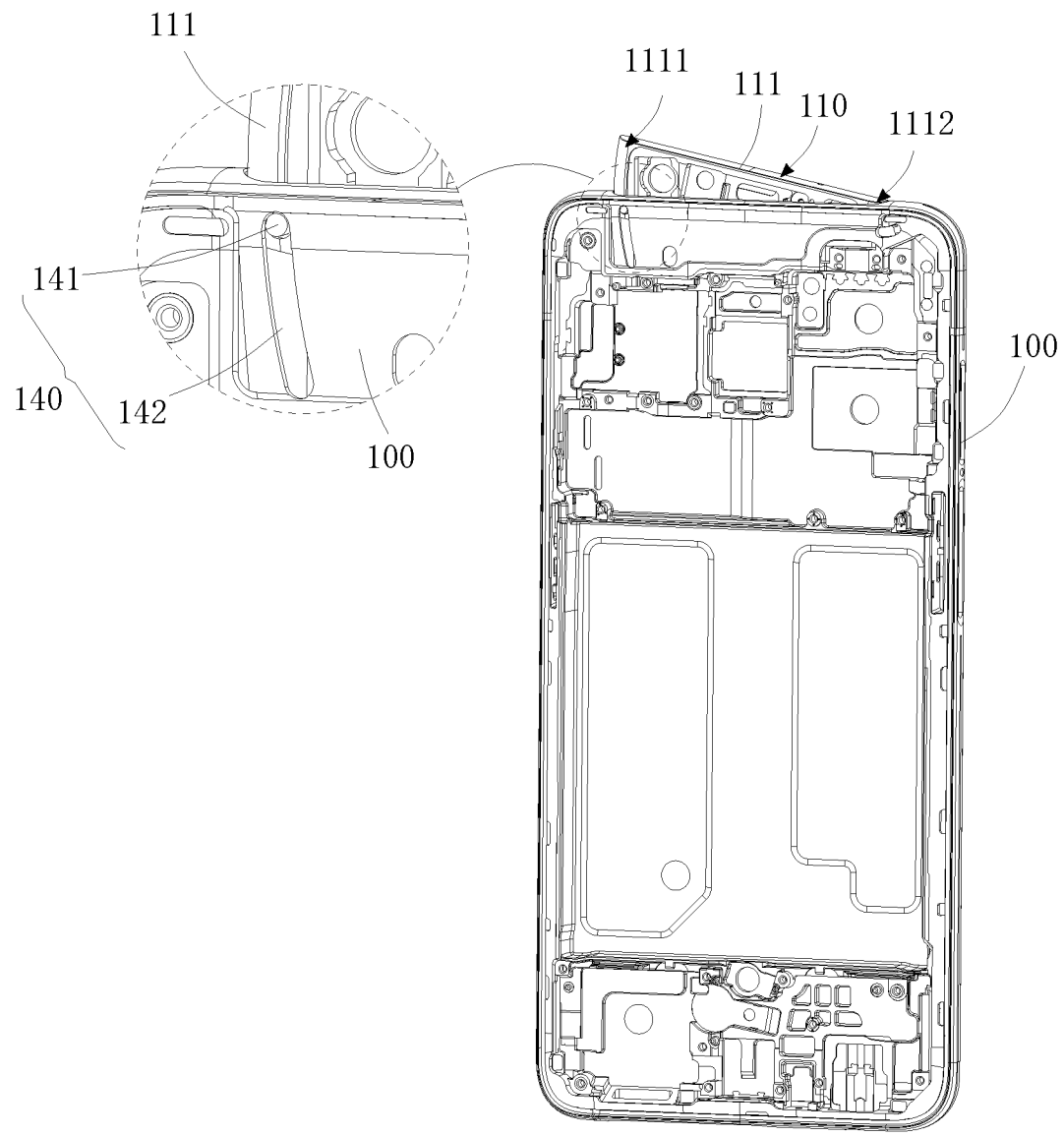

FIG. 1 and FIG. 2 are schematic diagrams illustrating a structure of a retractable functional assembly 110 installed to a frame 100 of an intelligent terminal according to an embodiment. The retractable functional assembly 110 is hidden in the frame 100 as shown in FIG. 1, and the retractable functional assembly 110 extends out of the frame 100 as shown in FIG. 2. The intelligent terminal described herein may be, for example, a terminal device such as a mobile phone, a tablet computer, or a smart watch.

In an embodiment, the retractable functional assembly 110 is installed to the frame 100 of the intelligent terminal. The retractable functional assembly 110 may be integrated with functional components such as a camera, a speaker or a light sensor, and the retractable functional assembly 110 is electrically connected to a control unit of the intelligent terminal. Signal transmission to various functional components on the retractable functional assembly 110 is performed by the control unit, so as to achieve functions such as photography and sound.

Figure 3:
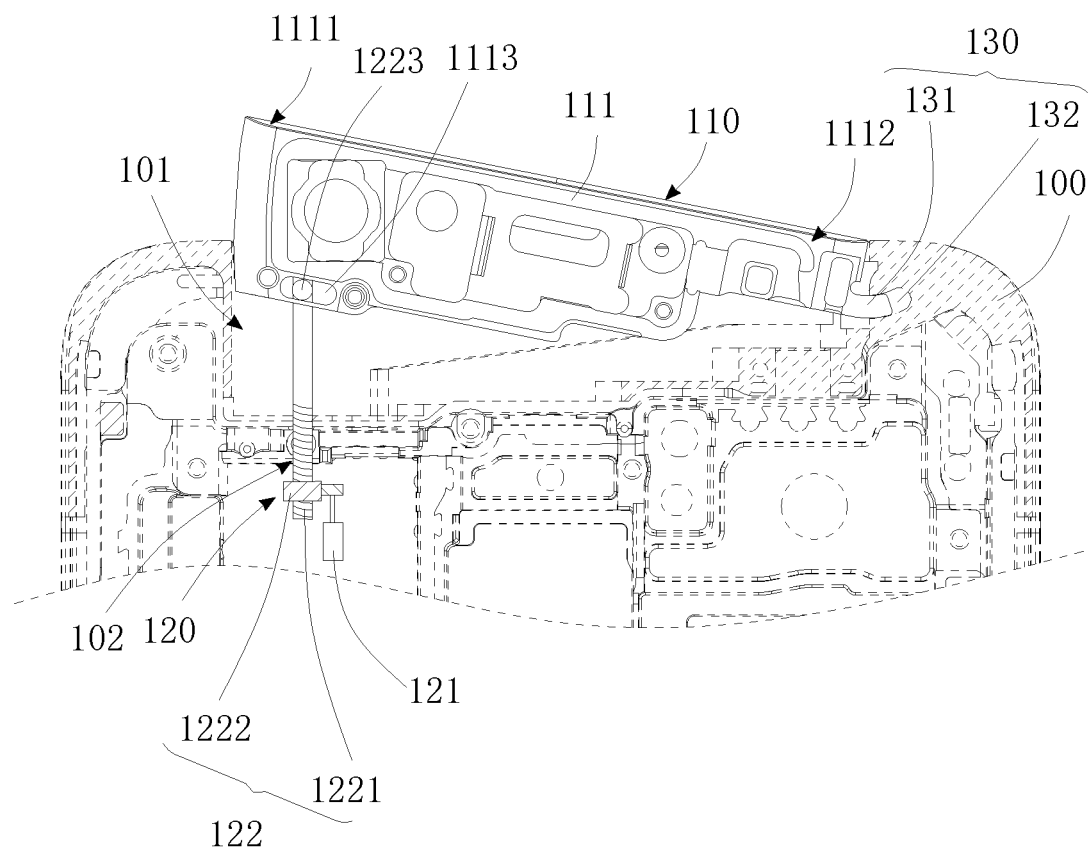
FIG. 3 is a schematic diagram illustrating an installation relationship between a retractable functional assembly and a part of a frame of an intelligent terminal according to an embodiment of the present disclosure.

FIG. 3 is a schematic diagram illustrating an installation relationship between the retractable functional assembly 110 and a part of the frame 100 of the intelligent terminal according to an embodiment, and the part of the frame 100 of the intelligent terminal is indicated by a dotted line as shown in FIG. 3. In an embodiment, the retractable functional assembly 110 includes a main body 111. As shown in FIG. 3, the main body 111 includes a rotatable end 1112 and a free end 1111. The rotatable end 1112 is rotatably connected to the frame 100 of the intelligent terminal, and the free end 1111 can rotate into or out of the frame 100. For example, in the case that a camera is integrated on the retractable functional assembly 110, the free end 1111 rotates out of the frame 100 to expose the camera when taking a selfie, and the free end 1111 rotates into the frame 100 to hide the camera in the frame 100 when not taking a selfie. When the main body 111 rotates into or out of the frame 100, the rotatable end 1112 maintains stable contact with the frame 100, thereby improving assembling reliability of the main body 111 with the frame 100 and increasing the service life.

For example, as shown in FIG. 3, the frame 100 is provided with a receiving groove 101, and the retractable functional assembly 110 can extend out of or be accommodated in the receiving groove 101. For example, the retractable functional assembly 110 may extend out of or be accommodated in the receiving groove 101 by means of the rotating manner described in the above embodiment. In other embodiments, the retractable functional assembly 110 may also adopt a sliding manner. For example, the main body 111 slides out of the receiving groove 101 in a linear direction, or retracts into the receiving groove 101 in a linear direction. The receiving groove 101 may be disposed at a top, a bottom or a side of the frame 100. The receiving groove 101 has at least one opening through which the free end 1111 of the retractable functional assembly 110 can extend outside.

In an embodiment, as shown in FIG. 3, the retractable functional assembly 110 further includes a driving 120 for driving the main body 111 to move. The driving module 120 is controlled by the control unit of the intelligent terminal. For example, a software may be activated by touching a screen of the intelligent terminal, and the driving 120 may be activate by the software. Alternatively, for example, physical buttons may be provided on the intelligent terminal, and the driving 120 may be activate by pressing the physical buttons. Specifically, the driving 120 is configured to move with the main body 111, such that the free end 1111 rotates out of the frame 100 of the intelligent terminal. The driving module 120 can also drive the main body 111 to rotate, so as to make the rotatable end 1112 rotate into the frame 100 of the intelligent terminal.

In an embodiment, as shown in FIG. 3, the driving 120 includes a motor 121 and a transmission assembly 122 connecting the motor 121 and the main body 111. The transmission assembly 122 is driven by the motor 121 to move, so as to push the free end 1111 out of the frame 100 or pull the free end 1111 into the frame 100. In the embodiment shown in FIG. 3, the transmission assembly 122 includes a connecting rod set that includes a threaded rod 1221 and a threaded sleeve 1222. The threaded sleeve 1222 is threaded outside the threaded rod 1221. The motor 121 can drive the threaded sleeve 1222 to rotate by means of gear engagement or belt transmission. A position of the threaded sleeve 1222 is unchanged relative to the motor 121, and thus rotation of the threaded sleeve 1222 may drive the threaded rod 1221 to move up and down. The free end 1111 of the main body 111 is provided with a sliding groove 1113, and an upper end of the threaded rod 1221 is slidably connected in the sliding groove 1113 through an insert pin 1223. As shown in FIG. 3, when the motor 121 drives the threaded sleeve 1222 to rotate, the threaded sleeve 1222 can drive the threaded rod 1221 to move up and down. Since the rotatable end 1112 of the main body 111 is rotatably connected to the frame body 100, the insert pin 1223 slides along the sliding groove 1113 when the threaded rod 1221 pushes or pulls the free end 1111. In other embodiments, the transmission assembly 122 may include a gear set. For example, a gear is fixedly connected to the main body 111, another gear is fixedly connected to a rotation shaft of the motor 121. The two gears are engaged, so that the main body 111 can be driven by the motor 121 to move, thereby causing the free end 1111 to rotate into or out of the receiving groove 101.

In an embodiment, as shown in FIG. 3, the frame 100 is further provided with a guide hole 102, and the threaded rod 1221 passes through the guide hole 102. The guide hole 102 is configured to guide the threaded rod 1221, so that the threaded rod 1221 slides only along an axial direction of the threaded rod 1221, thereby improving operating stability of the driving 120.

In an embodiment, as shown in FIG. 3, the terminal device includes the frame 100 and the retractable functional assembly 110. The free end 1111 of the retractable functional assembly 110 can slide in or out of the receiving groove 101 of the frame 100. The terminal device further includes a first guide assembly 130. The first guide assembly 130 includes an arc-shaped protruding rod 131 and an arc-shaped groove 132 that are slidably connected to each other. The arc-shaped protruding rod 131 is inserted into the arc-shaped groove 132, and the arc protruding rod 131 can slide reciprocally along a path in the arc-shaped groove 132. A center of a circle defined by the arc-shaped protruding rod 131 and the arc-shaped groove 132 coincides with a rotation center of the main body 111.

In the embodiment shown in FIG. 3, the rotatable end 1112 of the main body 111 of the retractable functional assembly 110 is provided with the arc-shaped protruding rod 131 for guiding rotation of the main body 111. The arc-shaped protruding rod 131 is substantially curved in an arc shape, and the center of the circle defined by the arc-shaped protruding rod 131 coincides with the rotation center of the main body 111. The frame 100 is provided with the arc-shaped groove 132. The arc-shaped groove 132 and the arc-shaped protruding rod 131 have a same radian, and the center of the circle defined by the arc-shaped groove 132 and the arc-shaped protruding rod 131 coincides with the rotation center of the main body 111. The movement of the main body 111 is guided by the first guide assembly 130, so that a movement direction of the main body 111 is more stable, thereby reducing or eliminating shaking of the free end 1111 of the main body 111. Moreover, the arc-shaped protruding rod 131 is inserted into the arc-shaped groove 132, so that the main body 111 and the frame 100 can be assembled more precisely and stably. In other embodiments, the rotatable end 1112 of the main body 111 of the retractable functional assembly 110 may be provided with the arc-shaped groove 132, and the frame 100 may be provided with the arc-shaped protruding rod 131 that slides into the arc-shaped groove 132.

In an embodiment, as shown in FIG. 2, the terminal device further includes a second guide assembly 140. The first guide assembly 130 and the second guide assembly 140 may be arranged at left and right sides of the retractable functional assembly 110. Specifically, one of the guide assemblies is arranged at a side where the free end 1111 of the main body 111 is located, and the other one of the guide assemblies is arranged at a side where the rotatable end 1112 of the main body 111 is located. The movement of the main body 111 is guided by the two guide assemblies, thereby further improving stability of the movement of the main body 111. Specifically, the second guide assembly 140 includes a limiting pin 141 and a limiting slot 142 that are slidably connected to each other. The limiting slot 142 is arc-shaped, and the limiting pin 141 can slide along the arc-shaped limiting slot 142. In the embodiment as shown in FIG. 2, the main body 111 is provided with the limiting pin 141, and the frame 100 is provided with the limiting slot 142. In other embodiments, the main body 111 may be provided with the limiting slot 142, and the frame 100 may be provided with the limiting pin 141. As shown in FIG. 2, the limiting slot 142 of the second guide assembly 140 may be disposed at a front wall of the receiving groove 101 of the frame 100. As shown in FIG. 3, the arc-shaped groove 132 of the first guide assembly 130 may be disposed at a right wall 214 of the receiving groove 101 of the frame 100.

In an embodiment, as shown in FIG. 2, the free end 1111 of the retractable functional assembly 110 can slide into or out of the receiving groove 101. The limiting pin 141 can slide only in the limiting slot 142 through the guiding effect of the second guide assembly 140, thereby limiting a rotation angle of the main body 111. As a result, only one portion of the free end 1111 can rotate out of the receiving groove 101, while another portion of the free end 1111 is received in the receiving groove 101. In this case, even if the one portion of the free end 1111 extends out of the receiving groove 101, the another portion of the free end 1111 and the rotatable end 1112 are received in the receiving groove 101, thereby increasing an area of connecting portions 275, 151 between the main body 111 and the frame 100 and thus increasing stability of the connection between the main body 111 and the frame 100.

In an embodiment, as shown in FIG. 3, the main body 111 of the retractable functional assembly 110 has an elongated strip shape, and the rotatable end 1112 and the free end 1111 of the main body 111 are respectively located at two ends of the main body 111 in a length direction. In this way, stability of the connection between the main body 111 and the frame 100 is increased.

In an embodiment, the first guide assembly 130 guides the main body 111 along one circular arc, and the second guide assembly 140 guides the main body 111 along another circular arc. A center of a circle defined by the one circular arc coincides with a center of a circle defined by the another circular arc, and both the centers coincide with the rotation center of the main body 111. In an embodiment, the rotation center of the main body 111 may be located outside the main body 111 or located on the main body 111. If the rotation center of the main body 111 is located outside the main body 111, the movement of the main body 111 is guided by the first guide assembly 130 and the second guide assembly 140, so as to make the rotation of the main body 111 more stable and smooth. If the rotation center of the main body 111 is located on the main body 111, a physical rotation shaft may be provided on the main body 111, so that the main body 111 is connected to the frame 100 by the rotation shaft and thus a stronger connecting strength between the main body 111 and the frame 100 can be achieved.

Figure 4A:
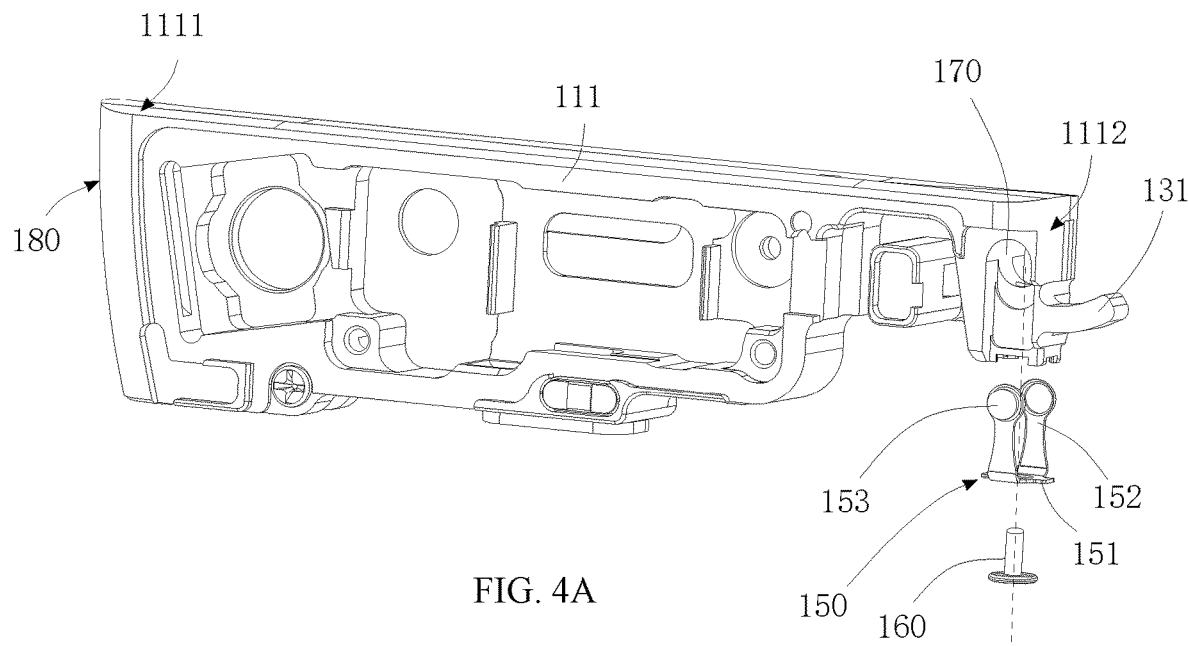
FIG. 4A and FIG. 4B are respectively diagrams of partial structures of a retractable functional assembly according to an embodiment of the present disclosure.
Figure 4B:
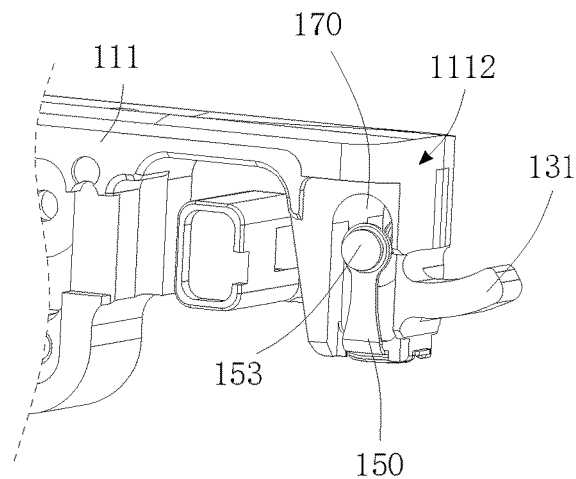

FIG. 4A and FIG. 4B are respectively diagrams of partial structures of the retractable functional assembly 110 according to an embodiment. An elastic rotation shaft 150 is provided at the rotatable end 1112 of the main body 111. The elastic rotation shaft 150 serves as a physical rotation shaft to connect the main body 111 to the frame 100. Specifically, the elastic rotation shaft 150 includes a connecting portion 151 and bent portions 152 respectively located at two sides of the connecting portion 151. The bent portions 152 are elastically connected to the connecting portion 151, and the bent portions 152 and the connecting portion 151 form a structure similar to "U" shape. Each of the bent portions 152 is provided with a respective protrusion 153, and the protrusions 153 on the two bent portions 152 extend respectively in directions away from each other. The protrusion 153 may have a cylindrical shape or a hemispherical shape. The front wall and a rear wall of the receiving groove 101 of the frame 100 are respectively provided with shaft grooves for receiving the protrusions 153, and the two protrusions 153 are rotatably connected in the shaft grooves to achieve the rotational connection between the main body 111 and the frame 100. As shown in FIG. 4A and FIG. 4B, the elastic rotation shaft 150 can be connected to the main body 111 by a connecting nail 160. The main body 111 is provided with recesses 170 that are symmetrical to each other. After the elastic rotation shaft 150 is installed to the main body 111, each of the protrusions 153 corresponds to a respective one of the two recesses 170. When the main body 111 is installed in the receiving groove 101, the two protrusions 153 are pressed so that the bent portions 152 are elastically deformed towards the recesses 170, thereby driving the two protrusions 153 to move into the recesses 170. After the main body 111 is installed in the receiving groove 101, under an action of an elastic restoring force, the two bent portions 152 undergo elastic restoration deformation in the directions away from each other, so that the two protrusions 153 move out of the recesses 170 and are inserted into the shaft grooves in the receiving groove 101.

In an embodiment, the terminal device includes a middle frame assembly, and the middle frame assembly includes a frame 100. The frame 100 is provided with a receiving groove 101, and a retractable functional assembly 110 is provided in the receiving groove 101. The retractable functional assembly 110 includes a main body 111 rotatably installed in the receiving groove 101, and a shape of the receiving groove 101 is substantially the same as a shape of the main body 111. The main body 111 includes a free end 1111 and a rotatable end 1112. The rotatable end 1112 may be rotatably connected in the receiving groove 101. The free end 1111 can rotate out of the receiving groove 101, and the free end 1111 can also rotate back into the receiving groove 101. As shown in FIG. 4A, a side of the free end 1111 away from the rotatable end 1112 is an arc-shaped side 180. A center of a circle defined by the arc-shaped side 180 can coincide with a rotation center of the main body 111. Accordingly, when the main body 111 rotates, a distance between the arc-shaped side 180 and one side wall of the receiving groove 101 substantially remains unchanged. One side of the receiving groove 101 is roughly fit with the arc-shaped side 180 or there is a small gap therebetween, so that the main body 111 and the receiving groove 101 have a high fitting accuracy and the main body 111 can smoothly rotate out of the receiving groove 101.

After the driving 120 drives the main body 111 to rotate into the receiving groove 101, as shown in FIG. 1, a surface of the main body 111 is flush with a surface of the frame 100, thereby ensuring the smooth surface of the terminal device or the middle frame assembly.

In some embodiments, the main body 111 may be provided with a camera module and a speaker module. When the free end 1111 of the main body 111 rotates out of the receiving groove 101, the camera module and the speaker module can operate normally. When the free end 1111 of the main body 111 rotates into the receiving groove 101, the camera module and the speaker module are also hidden in the receiving groove 101.

Figure 5A:
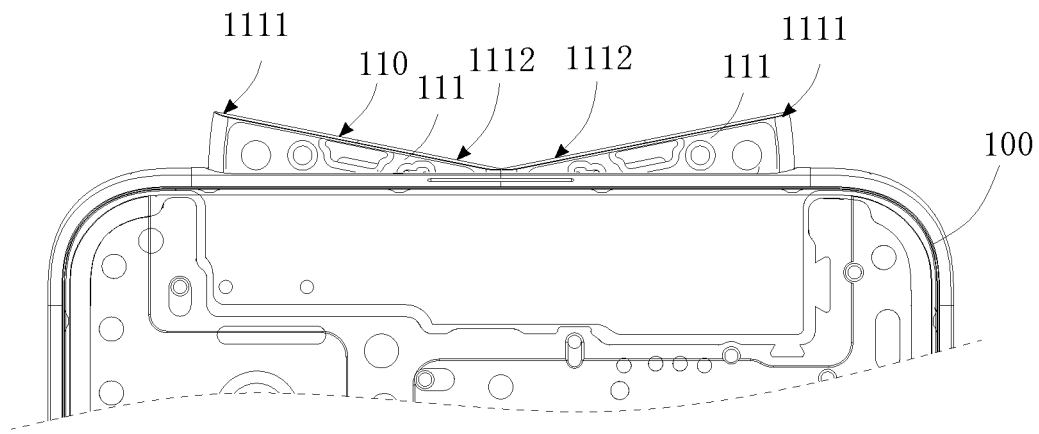
FIG. 5A and FIG. 5B are schematic structural diagrams of two terminal devices according to two embodiments of the present disclosure.
Figure 5B:
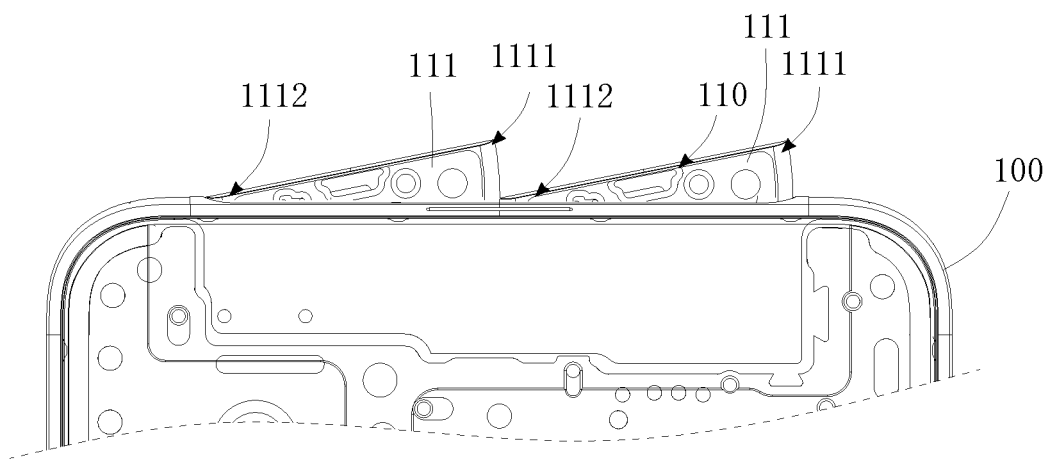

FIG. 5A and FIG. 5B respectively illustrate schematic structural diagrams of two terminal devices. The two terminal devices include retractable functional assemblies 110 with different structures. Each of the retractable functional assemblies 110 includes at least two main bodies 111, and each main body 111 includes a rotatable end 1112 and a free end 1111. The rotatable end 1112 is rotatably connected to the frame 100 of the intelligent terminal, and the free end 1111 can rotate into or out of the frame 100 of the intelligent terminal. The two main bodies 111 may be respectively provided with different cameras, such as a wide-angle camera, a telephoto camera, a main camera, and a deep-field camera. The four cameras can be evenly distributed on the two main bodies 111, that is, each main body 111 is provided with respective two cameras.

In an embodiment, the two main bodies 111 are driven by two independent driving modules 120. When the terminal device is a smart phone, different camera modes can be selected by the mobile app. The mobile phone pops up corresponding cameras according to the different camera modes selected by the user. Therefore, some cameras, which do not need to be activated in some camera modes, can still be hidden in the receiving groove 101. In this way, the camera can be protected, thereby increasing the service life of the camera and also preventing an accidental damage to the camera. Furthermore, since the number of times the main body 111 rotates out of the receiving groove 101 generally has a service life limit and requires additional power consumption, by popping up different cameras respectively, the number of times the main body 111 is popped up can be reduced, thereby increasing the service life, and also saving the power. In other embodiments, the speaker module and the camera module may also be respectively provided on the two main bodies 111. While calling, the speaker module is popped up and the camera module is not popped up; and while taking a picture, the camera module is popped up and the speaker module is not popped up.

Figure 6:
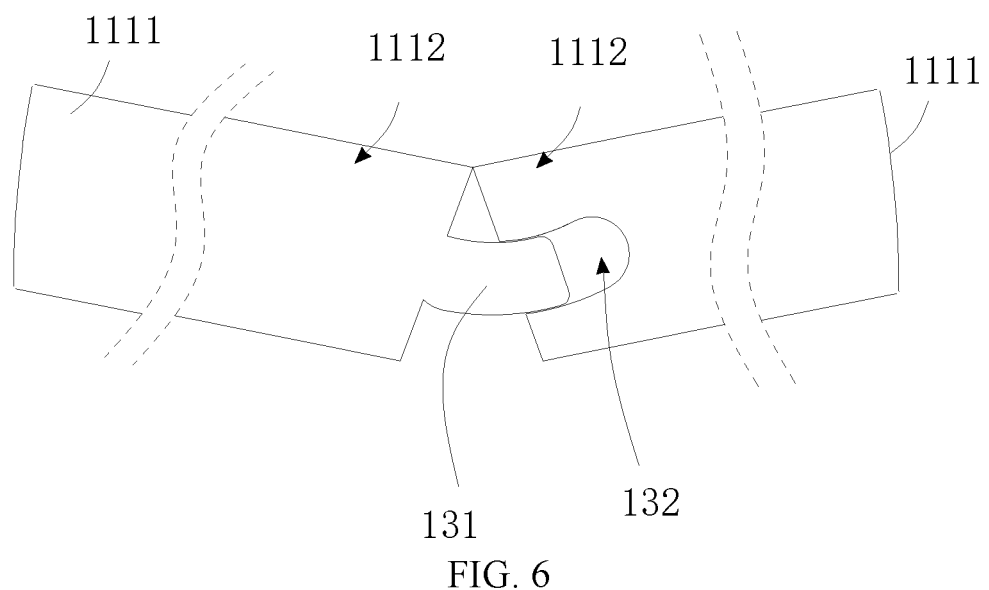
FIG. 6 is a schematic diagram illustrating connection between two main bodies according to the embodiment shown in FIG. 5A.

In the embodiment shown in FIG. 5A, the rotatable ends 1112 of the two main bodies 111 are located close to each other, and the free ends 1111 are located away from each other. FIG. 6 is a schematic diagram illustrating connection between the two main bodies 111 according to the embodiment shown in FIG. 5A. An arc-shaped protruding rod 131 is provided at one of the rotatable ends 1112, and an arc-shaped groove 132 is provided at the other one of the rotatable ends 1112. The arc-shaped protruding rod 131 is slidably inserted into the arc-shaped groove 132, and the arc-shaped protruding rod 131 and the arc-shaped groove 132 are slidably fitted with each other to guide the two main bodies 111.

In an embodiment, as shown in FIG. 2, the middle frame assembly includes the frame 100 and the retractable functional assembly 110. The frame 100 is provided with the receiving groove 101, and the retractable functional assembly 110 can extend out of or be received in the receiving groove 101. In the embodiment shown in FIG. 2, the retractable functional assembly 110 may extended out of or be received in the receiving groove 101 in a rotatable manner. In other embodiments, the retractable functional assembly 110 may extend out of or be received in the receiving groove 101 in a slidable manner. In order to make the retractable functional assembly 110 slide into or out of the receiving slot more smoothly, a gap is formed between a side wall of the receiving groove 101 and a side wall of the retractable functional assembly 110. For example, a gap with a size of 0.1 mm is formed between each side of the retractable functional assembly 110 and a respective one of the sides of the receiving groove 101, thereby ensuring that the retractable functional assembly 110 can slide into or out of the receiving groove 101 smoothly and preventing the gap from being too large and thus affecting the appearance or accumulating dust.

In an embodiment, the middle frame assembly further includes a supporting assembly. The supporting assembly is supported between at least one set of opposite surfaces of the retractable functional assembly 110 and corresponding inner walls of the receiving groove 101, so that the retractable functional assembly 110 is received in the receiving groove 101 to form abutment. In this way, when the retractable functional assembly 110 extends out of or slides into the receiving groove 101, a distance between the side wall of the retractable functional assembly 110 and the inner wall of the receiving groove 101 remains constant, thereby preventing the retractable functional assembly 110 from shaking inside the receiving groove 101.

Figure 7:
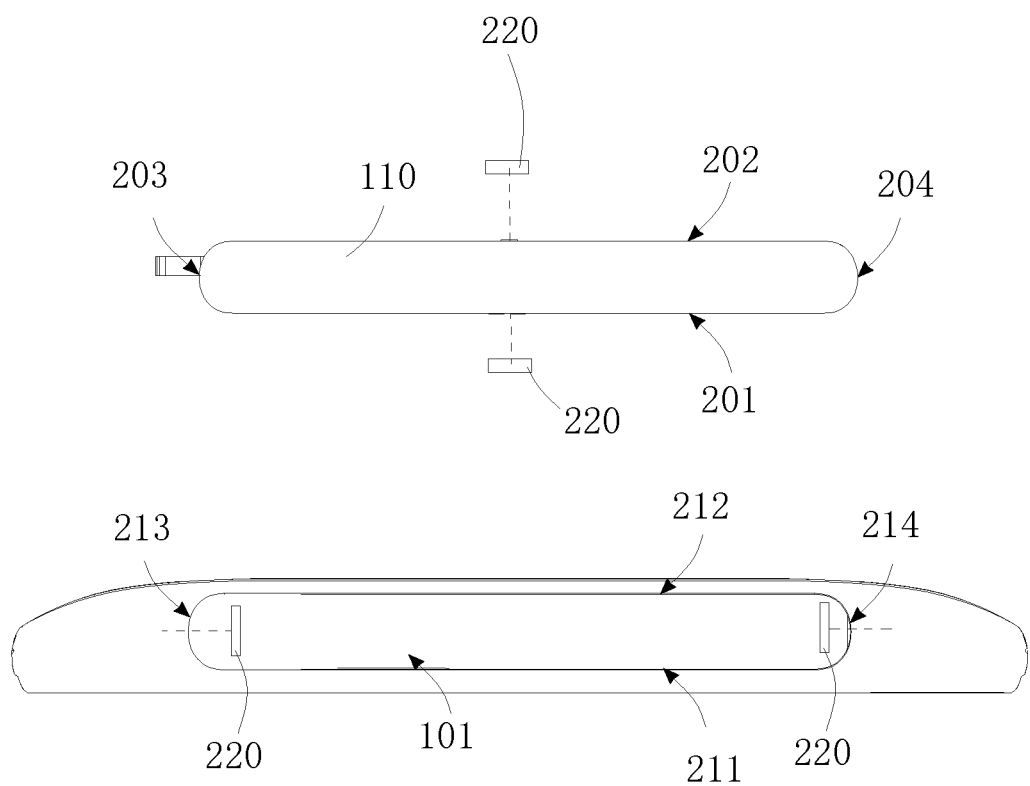
FIG. 7 is a top view of an exploded structure of a middle frame assembly according to an embodiment of the present disclosure.

FIG. 7 is a top view of an exploded structure of the middle frame assembly according to an embodiment. In an embodiment, the retractable functional assembly 110 has a front surface 201, a rear surface 202, a left surface 203, and a right surface 204. The receiving groove 101 includes at least a front side wall 211, a rear side wall 212, a left side wall 213, and a right side wall 214. The front and rear surfaces are opposite to each other, the left and right surfaces are opposite to each other, the front and rear side walls are opposite to each other, and the left and right side walls are opposite to each other. When the retractable functional assembly 110 shown in FIG. 7 is installed in the receiving groove 101 of the middle frame assembly, the front surface 201 corresponds to the front side wall 211, the rear side wall 212 corresponds to the rear surface 202, the left surface 203 corresponds to the left side wall 213, and the right surface 204 corresponds to the right side wall 214. The supporting assembly includes at least two supporting blocks 220. The supporting blocks 220 may be installed on the retractable functional assembly 110 or in the receiving groove 101. As shown in FIG. 7, the supporting assembly includes four supporting blocks 220. Two of the four supporting blocks 220 are installed to the rear surface 202 and the front surface 201, and the other two of the four supporting blocks 220 are installed to the left side wall 213 and the right side wall 214, along a direction indicated by a dotted line shown in FIG. 7.

The four supporting blocks 220 correspondingly support the surfaces of the retractable functional assembly 110 or the inner walls of the receiving groove 101, so that the side walls of the supporting blocks 220 do not directly contact the side walls of the receiving groove 101. In some embodiments, the respective distance between each side wall of the supporting block 220 and each corresponding side wall of the receiving groove 101 has a same value, so that the gaps are relatively uniform, thereby avoiding a situation in which the gap formed at one side is relatively small while the gap formed at another side is relatively large, and thus solving the problem of non-uniform gaps.

Figure 8A:
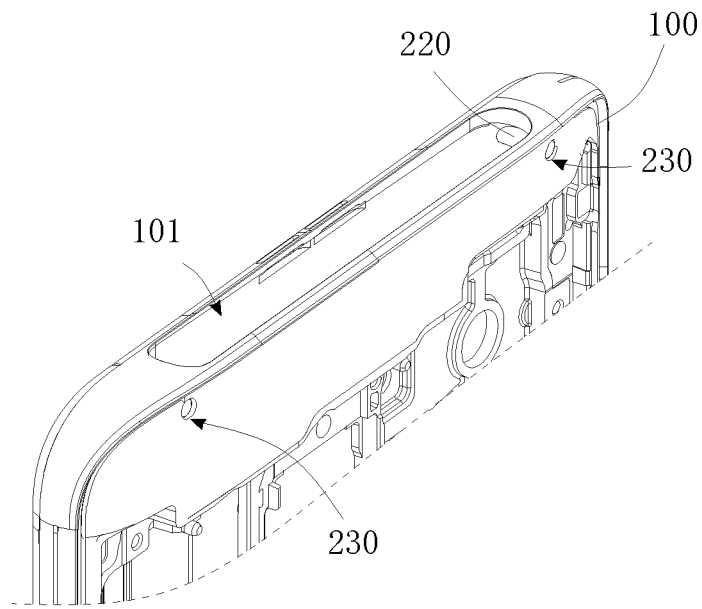
FIG. 8A is a schematic diagram of a partial structure of a middle frame assembly according to an embodiment of the present disclosure.
Figure 8B:
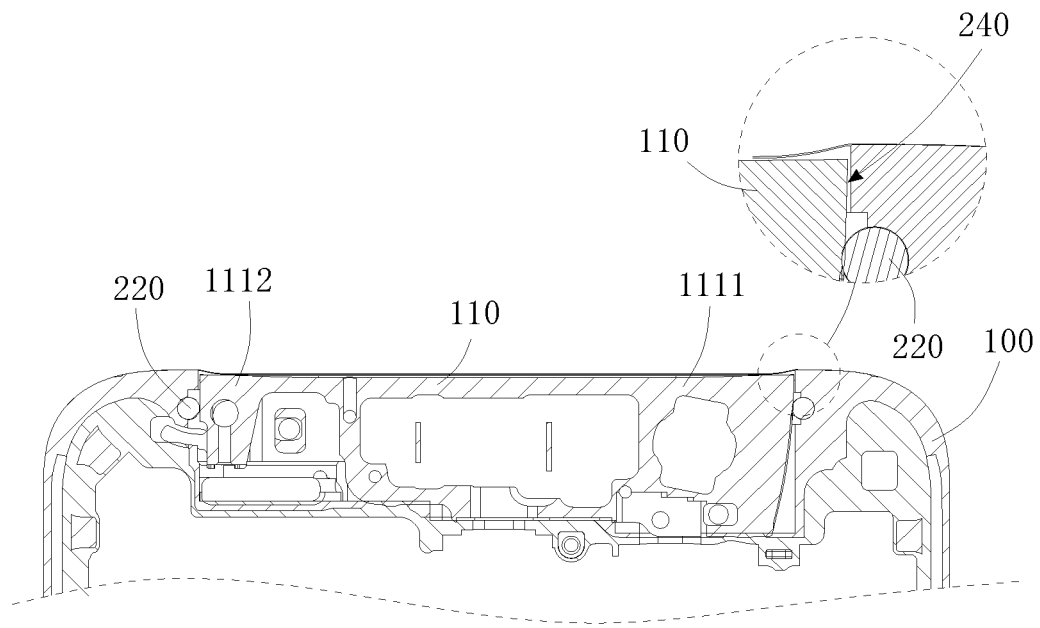
FIG. 8B is a schematic cross-sectional view of a partial structure of a middle frame assembly according to an embodiment of the present disclosure.

In an embodiment, the supporting blocks 220 may be fixed inside the receiving groove 101 or fixed to the retractable functional assembly 110 by adhesive. In some embodiments, as shown in FIG. 8A, the middle frame assembly may be provided with insertion holes 230, through which the supporting blocks 220 are inserted into the receiving groove 101. Two ends of the supporting block 220 are kept in the insertion hole 230, thereby improving installing firmness of the supporting block 220. As shown in FIG. 8B, when the retractable functional assembly 110 is received in the receiving groove 101, the supporting blocks 220 at two sides are respectively supported between the retractable functional assembly 110 and the side walls of the receiving groove 101. Accordingly, a gap 240 is formed between the retractable functional assembly 110 and the side wall of the receiving groove 101, thereby reducing a frictional resistance when the retractable functional assembly 110 slides into or out of the receiving groove 101.

In some embodiments, the supporting block 220s may also be installed in the receiving groove 101 or at the surface of the retractable functional assembly 110 in a rolling manner. For example, the supporting block 220 may be formed as a spherical shape, and an arc-shaped hole is formed in the receiving groove 101 or the retractable functional assembly 110. In this case, after the spherical supporting block 220 is installed in the arc-shaped hole, it can roll freely, thereby improving smoothness of the retractable functional assembly 110 sliding into or out of the receiving groove 101.

Figure 9A:
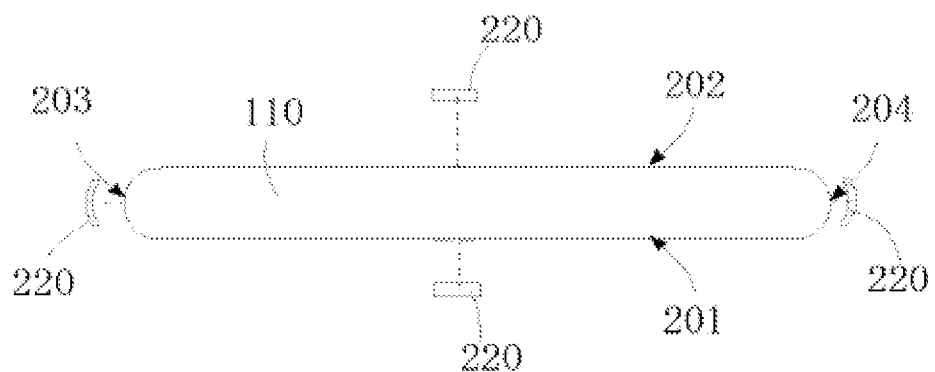
FIG. 9A is a top view of a retractable functional assembly according to an embodiment of the present disclosure.
Figure 9B:
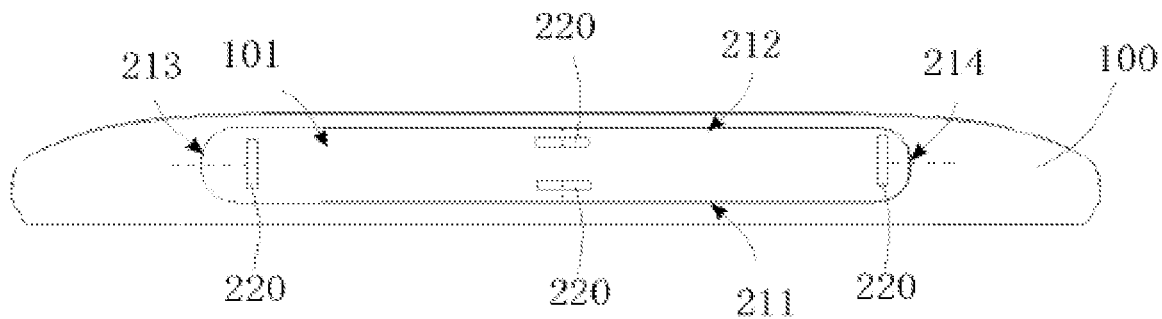
FIG. 9B is a top view of a frame according to an embodiment of the present disclosure.

In an embodiment, as shown in FIG. 9A, a respective supporting block 220 may be provided respectively at the front surface 201, the rear surface 202, the left surface 203, and the right surface 204 of the retractable functional assembly 110. A respective supporting block 220 may also be provided respectively at the front side wall 211, the rear side wall 212, the left side wall 213, and the right side wall 214 of the receiving groove 101, as shown in FIG. 9B.

In some embodiments, if a respective supporting block 220 is arranged respectively at opposite side walls of the receiving groove 101, for example, at the left side wall 213 and the right side wall 214, then an end of the respective supporting block 220 movably supports the left surface 203 and the right surface 204 of the retractable functional assembly 110, respectively.

In some embodiments, the retractable functional assembly 110 may include a main body 111 and a sensor module provided on the main body 111, and the sensor module may include a camera module or a speaker module.

In some embodiments, the supporting block 220 is a wear-resistant block, or a wear-resistant layer is provided at a surface of the supporting block 220. For example, the supporting block 220 may be made of POM (Polyoxymethylene) plastic.

Figure 10:
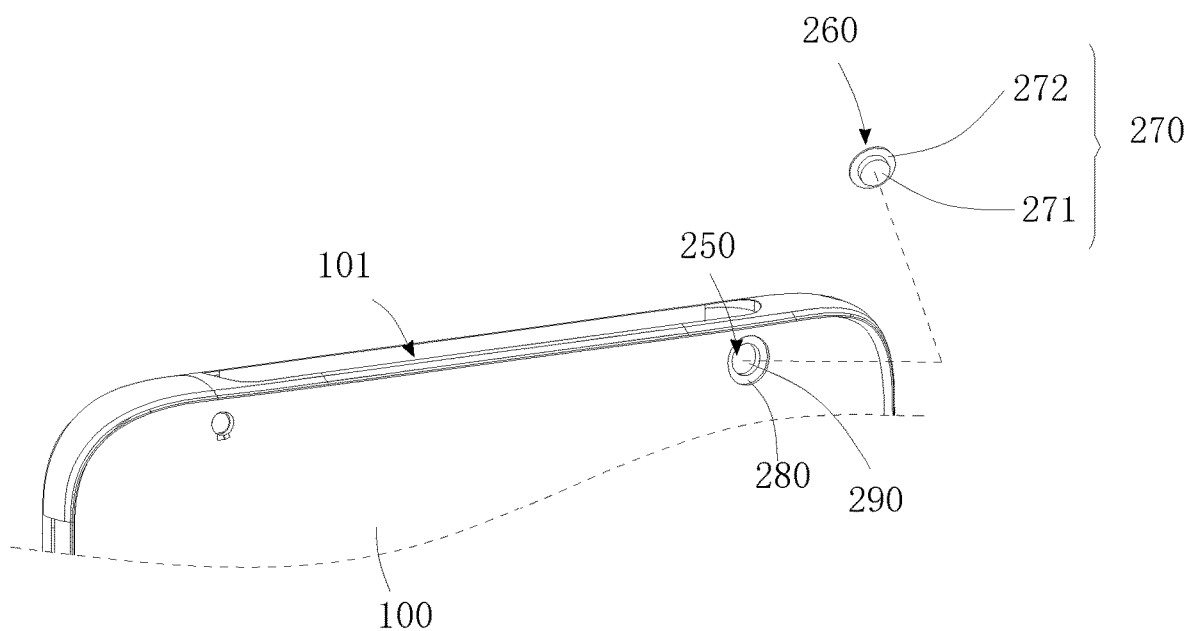
FIG. 10 is a diagram of a partial structure of a conductive assembly of a middle frame assembly according to an embodiment of the present disclosure.

In an embodiment, the retractable functional assembly 110 is electrically connected to the control unit of the intelligent terminal, thereby supplying power to the retractable functional assembly 110. The retractable functional assembly 110 is movably connected in the receiving groove 101 of the frame 100. FIG. 10 is a diagram of a partial structure of a conductive assembly 260 of the middle frame assembly according to an embodiment. As shown in FIG. 10, the frame 100 may be provided with a conductive part 250, and the conductive part 250 can be electrically connected to the control unit of the intelligent terminal. The retractable functional assembly 110 is provided with a conductive portion, and a conductive component 260 is provided between the conductive part 250 and the conductive portion. That is, the conductive part 250 is electrically connected to the conductive portion through the conductive assembly 260, thereby supplying power to the retractable functional assembly 110.

In an embodiment, the conductive assembly 260 includes a first conductive member provided on the conductive portion and a second conductive member 270 provided on the conductive part 250. The first conductive member slidably abuts against the second conductive member 270, and the second conductive member 270 is welded to the conductive part 250. The first conductive member may be welded to the conductive portion, or the first conductive member may also be integrally formed with the conductive portion.

In some embodiments, the frame 100 may be formed by surface oxidation of an aluminum material. The surface oxidation can increase the strength of the frame 100. After the surface oxidation, the oxide layer attached to the surface of the frame 100 causes the frame 100 non-conductive. An individual second conductive member 270 is provided, and the second conductive member 270 may be made of metal with excellent electrical conductivity. The second conductive member 270 may be welded to the frame 100 so as to achieve electrical connection. The second conductive member 270 then slidably abuts against the first conductive member to achieve electrical connection, thereby achieving electrical connection between the retractable functional assembly 110 and the frame 100. In this way, reliability of the electrical connection between the retractable functional assembly 110 and the frame 100 is improved. In some embodiments, the oxide layer on the surface of the frame 100 is destroyable, and the first conductive member directly abuts against a portion of the frame 100 where the oxide layer is destroyed, so as to achieve electrical connection between the retractable functional assembly 110 and the frame 100. However, since it is difficult to control a process for destroying the oxide layer, the oxide layer may be destroyed incompletely or excessively, resulting in poor electrical connection. Therefore, in the above embodiments, the individual second conductive member 270 is provided to achieve more reliable and stable electrical connection between the retractable functional assembly and the frame 100.

As shown in FIG. 10, the conductive part 250 may be a through hole 290 provided in the frame 100. The through hole 290 penetrates through a side wall in which it is accommodated. When the retractable functional assembly 110 is installed in the receiving groove 101, the second conductive member 270 can just abuts against the first conductive member on the retractable functional assembly 110 located in the receiving groove 101 after being inserted into the through hole 290. The first conductive member then slidably abuts against the second conductive member 270 to achieve supplying power to the retractable functional assembly 110.

In an embodiment, as shown in FIG. 10, the second conductive member 270 includes an insertion rod 271 and a connecting cap 272 that are connected to each other. The insertion rod 271 is inserted into the through hole 290, and the connecting cap 272 abuts against the frame 100. In an example, the insertion rod 271 and the connecting cap 272 are both cylindrical structures. The cylindrical insertion rod 271 and the cylindrical connecting cap 272 are fixedly connected coaxially. A radius of a bottom surface of the insertion rod 271 is smaller than a radius of a bottom surface of the connecting cap 272. The radius of the bottom surface of the insertion rod 271 may be slightly smaller than a radius of the through hole 290 in order to smooth insertion. In some embodiments, the radius of the bottom surface of the insertion rod 271 is substantially equal to the radius of the through hole 290, so that the insertion rod 271 is fitted with an inner wall of the through hole 290, thereby improving connecting reliability between the insertion rod 271 and the middle frame assembly. When the insertion rod 271 is inserted into the through hole 290, one end of the insertion rod 271 can slightly extend into the receiving groove 101, so that the first conductive member can reliably abut against the insertion rod 271. In some embodiments, the first conductive member may be an elastic member, so that the first conductive member can elastically abut against the insertion rod 271, thereby improving reliability of the electrical connection. In some embodiments, the first conductive member may be an elastic sheet coated with gold.

In some embodiments, the surface of the first conductive member and the surface of the second conductive member 270 are both coated with a respective gold layer. On the one hand, since the first conductive member slidably abuts against the second conductive member 270, the gold layer can improve wear resistance of the conductive members; and on the other hand, the gold layer has better electrical conductivity, thereby improving conductive reliability of the conductive members.

In an embodiment, as shown in FIG. 10, the frame 100 is provided with a sink groove 280 that communicates with the through hole 290, and the sink groove 280 is configured to receive the connecting cap 272. The connecting cap 272 of the second conductive member 270 abuts against a bottom of the sink groove 280, so that the second conductive member 270 can be reliably electrically connected to the frame 100. In some embodiments, the second conductive member 270 may be made of copper or gold, thereby improving the electrical conductivity.

In some embodiments, in order to improve connecting reliability between the second conductive member 270 and the frame 100, the second conductive member 270 may be connected to the conductive part 250 of the frame 100 by welding. Preferably, a spot welding method can be adopted to achieve physical connection. The spot welding method fuses the second conductive member 270 and the frame 100 into an integer, so that the second conductive member 270 will not move relative to the frame 100, thereby avoiding poor contact.

In some embodiments, a depth of the sink groove 280 is smaller than or equal to a thickness of the connecting cap 272, so that the connecting cap 272 can be received in the sink groove 280. The connecting cap 272 can increase an area where the second conductive member 270 is connected to the frame 100, and receiving the connecting cap 272 into the sink groove 280 can reduce an internal space of the terminal device occupied by the connecting cap 272, thereby effectively utilizing the internal space of the terminal device.

Figure 11A:
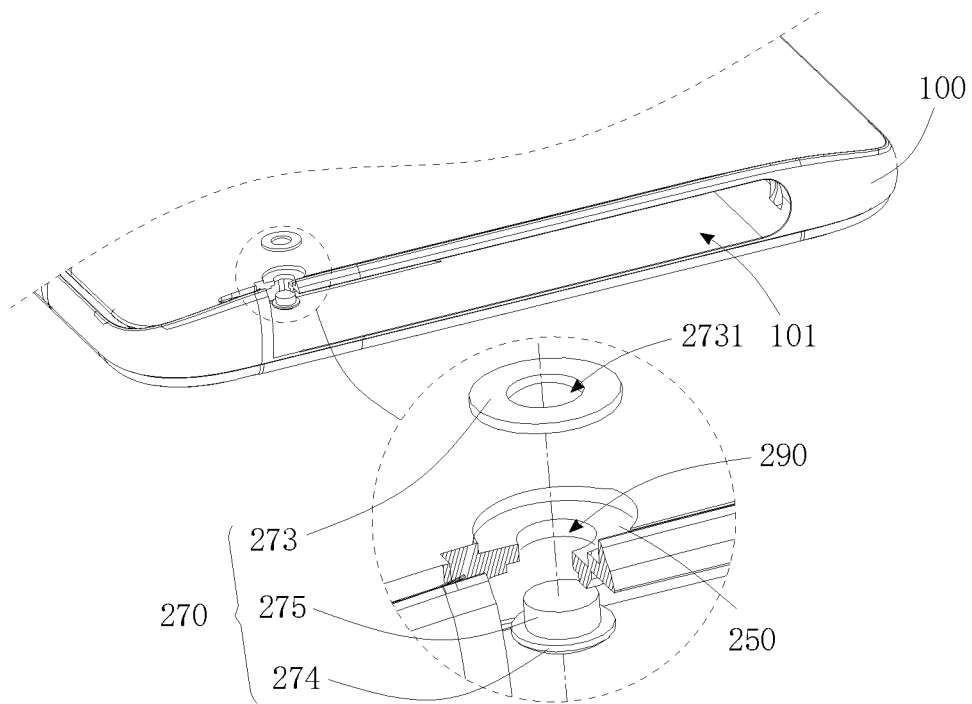
FIG. 11A is a structural diagram of a frame according to an embodiment of the present disclosure.

In an embodiment, as shown in FIG. 3, the middle frame assembly includes the frame 100 and the retractable functional assembly 110. The frame 100 is provided with the receiving groove 101, the retractable functional assembly 110 is movably received in the receiving groove 101, and the retractable functional assembly 110 can extend out of or be received in the receiving groove 101. FIG. 11A is a structural diagram of a frame 100 according to an embodiment. The receiving groove 101 of the frame 100 is provided with a conductive part 250, the retractable functional assembly 110 includes a conductive portion, and the conductive part 250 is electrically connected to the conductive portion through the conductive assembly 260, thereby achieving electrical connection between the frame 100 and the retractable functional assembly 110. The material of the conductive assembly 260 is different from the material of the frame 100. For example, the frame 100 may be made of an aluminum material that has a relatively low weight, and the conductive assembly 260 may be made of a gold material with better electrical conductivity and stronger wear resistance. A terminal device may include a battery, and the battery provides power to the retractable functional assembly 110 through the frame 100. The conductive assembly 260 includes a first conductive member provided on the retractable functional assembly 110 and a second conductive member 270 provided on the conductive part 250. The first conductive member slidably abuts against the second conductive member 270.

In the embodiment shown in FIG. 11A, the second conductive member 270 includes a first clamping portion 273, a second clamping portion 274, and a connecting portion 275. The connecting portion 275 is integrated with the second clamping portion 274, and the frame 100 is provided with a through hole 290 penetrating through one side wall of the receiving groove 101. A connecting hole 2731 is formed at a middle portion of the first clamping portion 273. The connecting portion 275 passes through the through hole 290 and then is inserted into the connecting hole 2731. The first clamping portion 273 and the connecting portion 275 are then welded. A shape and a size of the through hole 290 in this embodiment correspond to a shape and a size of the connecting portion 275, so that the connecting portion 275 can move only in an axial direction after being inserted into the through hole 290, and cannot move in a radial direction. The first clamping portion 273 and the connecting portion 275 may be made of a same material, and welding a same material can achieve a stronger connecting strength between the first clamping portion 273 and the connecting portion 275, thereby avoiding a phenomenon of pseudo welding or unsecured welding. The first clamping portion 273 is connected to the connecting portion 275 by welding, so that the first clamping portion 273 can be firmly connected to the connecting portion 275, thereby avoiding a problem of unsecured welding caused by welding different materials. After the second clamping portion 274 is installed, the first clamping portion 273 and the second clamping portion 274 respectively clamp two sides of one side wall of the receiving groove 101. According to the embodiment, i.e., the first clamping portion 273 and the second clamping portion 274 clamp two sides of one side wall of the receiving groove 101, the second conductive member 270 is not necessary to be welded to the frame 100. In order to improve the connecting strength and reliability of the electrical connection between the second conductive member 270 and the frame 100, when the first clamping portion 273 and the second clamping portion 274 respectively clamp two sides of one side wall of the receiving groove 101, the second conductive member 270 may be further spot-welded to the frame 100. In this embodiment, the first clamping portion 273 is detachably connected to the connecting portion 275, and the first clamping portion 273 and the second clamping portion 274 may be shaped as any of a circular ring, a cylinder, or a square, etc., as long as the first clamping portion 273 and the second clamping portion 274 cannot pass through the through hole 290.

In other embodiments, the first clamping portion 273, the second clamping portion 274, and the connecting portion 275 are three individual parts, respectively, and the first clamping portion 273, the second clamping portion 274 and the connecting portion 275 may be connected by welding. Similarly, the first clamping portion 273, the second clamping portion 274 and the connecting portion 275 are all made of a same material having good electrical conductivity, so that the welding firmness can be improved. In this embodiment, the first clamping portion 273, the second clamping portion 274 and the connecting portion 275 are all detachably connected, thereby facilitating installation of the second conductive member 270 onto the frame 100.

Figure 11B:
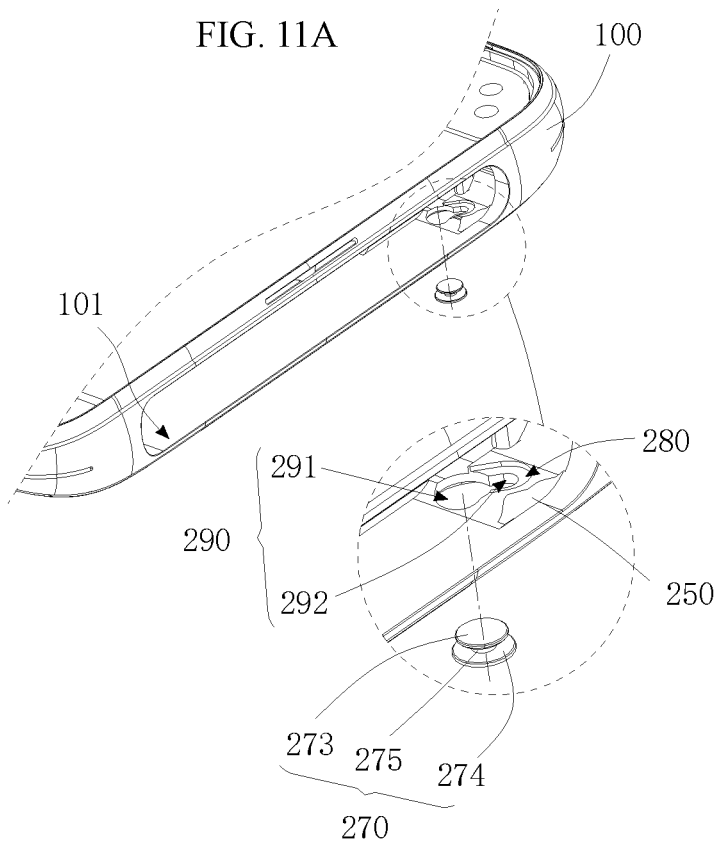
FIG. 11B is a structural diagram of another frame according to an embodiment of the present disclosure.

FIG. 11B is a schematic structural diagram of a frame 100 according to another embodiment. In the embodiment shown in FIG. 11B, the first clamping portion 273, the connecting portion 275 and the second clamping portion 274 are integrally formed, and the first clamping portion 273 and the second clamping portion 274 are respectively disposed at two sides of the connecting portion 275. That is, a longitudinal cross section of the second conductive member 270 has a roughly "I" shape. In this embodiment, the through hole 290 is not a cylindrical hole, and the connecting portion 275 can slide in the through hole 290 along a radial direction of the connecting portion 275. For example, the through hole 290 may include a first working section 291 and a second working section 292, and the first working section 291 communicates with the second working section 292. During installation, the second conductive member 270 is inserted into the first working section 291, and then the second conductive member 270 is moved to the second working section 292. The first clamping portion 273 and the second clamping portion 274 clamp at an outer periphery of the side wall of the through hole 290 at the second working section 292.

In an embodiment, the first clamping portion 273, the second clamping portion 274 and the connecting portion 275 may all be cylindrical structures. Each of the radius of the first clamping portion 273 and the radius of the second clamping portion 274 is larger than the radius of the connecting portion 275, and a contour of the connecting portion 275 may be approximately equal to a contour of the second working section 292, so that the connecting portion 275 can smoothly slide into the second working section 292.

In an embodiment, the radius of the first clamping portion 273 is equal to the radius of the second clamping portion 274. In another embodiment, the radius of the first clamping portion 273 may be smaller than the radius of the second clamping portion 274.

In an embodiment, each of the first working section 291 and the second working section 292 may be a circular arc hole, and a diameter of a circle defined by the first working section 291 is larger than a diameter of a circle defined by the second working section 292. Further, the diameter of the circle defined by the first working section 291 is larger than an outer diameter of the first clamping portion 273, so that the first clamping portion 273 of the second conductive member 270 can be inserted into the first working section 291. Then the second conductive member 270 is moved, so as to move the second conductive member 270 to the second working section 292. At this time, neither the first clamping portion 273 nor the second clamping portion 274 can pass through the second working section 292, so that the second conductive member 270 is stuck at the second working section 292. That is, the first clamping portion 273 and the second clamping portion 274 jointly clamp the frame 100 at the outer periphery of the second working section 292. In this case, the second conductive member 270 is an integral part, which greatly facilitates installation of the second conductive member 270. In some embodiments, a step of welding the second conductive member 270 to the frame 100 may be further provided in order to more firmly connect the second connection member and the frame 100.

In an embodiment, as shown in FIG. 11B, the frame 100 is provided with a sink groove 280 communicating with the through hole 290. Specifically, the sink groove 280 is correspondingly provided at the outer periphery of the second working section 292. When the second conductive member 270 moves to the second working section 292, the first clamping portion 273 or the second clamping portion 274 can be accommodated in the sink groove 280. Two sink grooves 280 are provided, which are respectively provided inside and outside of the receiving groove 101. Specifically, one of the sink grooves 280 shown in FIG. 11B is disposed inside the receiving groove 101, and the other one of the sink grooves 280 is disposed at an outer surface of the side wall of the receiving groove 101.

In the embodiment shown in FIG. 11B, an area near the sink groove 280 is the conductive part 250, and the sink groove 280 may be formed by a milling process. During the milling process, the oxide layer on the frame 100 can be destroyed, that is, the internal metal of the frame 100 is completely exposed. The second conductive member 270 directly contacts the internal metal of the frame 100, thereby ensuring stability of the electrical conduction.

The technical features of the above-mentioned embodiments can be combined to each other. In order to make the description concise, not all possible combinations of the technical features are described in the above-mentioned embodiments. However, as long as there is no conflict on the combination of these technical features, this combination shall be considered as falling within a scope of the present disclosure.

The above-mentioned embodiments merely describe several embodiments of the present disclosure, and the description therefor is relatively specific and detailed, but it should not be considered as a limitation on the scope of the present disclosure. Those skilled in the art will appreciate that various change, replacement and modification may be made to the embodiment without departing from the principle and spirit of present invention, and the scope of the present invention is limited solely by the appended claims and its equivalents.

What is claimed is:

1. A retractable functional assembly, wherein the retractable functional assembly is configured to be installed to a frame of an intelligent terminal and electrically connected to a control unit of the intelligent terminal, and the retractable functional assembly comprises:
    a main body comprising a rotatable end and a free end, the rotatable end being rotatably connected to the frame of the intelligent terminal, and the free end being configured to rotate into or out of the frame of the intelligent terminal;
    a camera module provided on the main body and configured to move with the main body; and
    a driving member configured to drive the main body to move, wherein when the driving member drives the rotatable end to rotate in such a manner that the free end rotates out of the frame of the intelligent terminal, the camera module is exposed from the frame of the intelligent terminal, and when the driving member drives the main body to rotate in such a manner that the free end rotates into the frame of the intelligent terminal, the camera module is hidden in the frame of the intelligent terminal, and
    wherein the rotatable end of the main body is provided with an elastic rotation shaft, the elastic rotation shaft comprises a connecting portion and bent portions respectively provided at two sides of the connecting portion, the bent portions are elastically connected to the connecting portion, and each of the bent portions is provided with a respective connecting protrusion.

2. The retractable functional assembly according to claim 1, wherein the rotatable end is provided with a protruding rod or a groove that is configured to guide rotation of the main body, and a center of a circle defined by the protruding rod or the groove coincides with a rotation center of the main body.

3. The retractable functional assembly according to claim 1, wherein the driving member comprises a motor and a transmission assembly connecting the motor and the main body.

4. A retractable functional assembly, wherein the retractable functional assembly is configured to be installed to a frame of an intelligent terminal, and the retractable functional assembly comprises:
    two main bodies, each of the two main bodies comprising a rotatable end and a free end, the rotatable end being rotatably connected to the frame of the intelligent terminal, and the free end being configured to rotate into or out of the frame of the intelligent terminal;
    a camera module and a speaker module respectively provided on two main bodies of the two main bodies or both provided on one of the two main bodies; and
    a driving member configured to drive the two main bodies to move synchronously or one of the two main bodies to move independently, wherein when the driving member drives the rotatable end of each of the two main bodies or one of the two main bodies to rotate in such a manner that the free end of each of the two main bodies or the one of the two main bodies rotates out of the frame of the intelligent terminal, at least one of the camera module or the speaker module is exposed from the frame of the intelligent terminal, and when the driving module member drives the rotatable end of each of the two main bodies or one of the two main bodies to rotate in such a manner that the free end of each of the two main bodies or the one of the two main bodies rotates into the frame of the intelligent terminal, the at least one of the camera module or the speaker module is hidden in the frame of the intelligent terminal.

5. The retractable functional assembly according to claim 4, wherein rotatable ends of the two main bodies are located adjacent to each other, and free ends of the two main bodies are located away from each other.

6. The retractable functional assembly according to claim 5, wherein the rotatable end of one of the two main bodies is provided with a protruding rod, the rotatable end of the other one of the two main bodies is provided with a groove, and the protruding rod is slidably inserted into the groove, and wherein the protruding rod slidably cooperates with the groove to guide movement of the two main bodies.

7. A middle frame assembly, comprising a retractable functional assembly, wherein the retractable functional assembly is configured to be installed to a frame of an intelligent terminal and electrically connected to a control unit of the intelligent terminal, and the retractable functional assembly comprises:
- a main body comprising a rotatable end and a free end, the rotatable end being rotatably connected to the frame of the intelligent terminal, and the free end being configured to rotate into or out of the frame of the intelligent terminal;
- a camera module provided on the main body and configured to move with the main body; and
- a driving member configured to drive the main body to move, wherein when the driving member drives the rotatable end to rotate in such a manner that the free end rotates out of the frame of the intelligent terminal, the camera module is exposed from the frame of the intelligent terminal, and when the driving member drives the main body to rotate in such a manner that the free end rotates into the frame of the intelligent terminal, the camera module is hidden in the frame of the intelligent terminal; and
- wherein the middle frame assembly comprises the frame, the frame is provided with a receiving groove, and the main body of the retractable functional assembly is rotatably installed in the receiving groove, and
- wherein the rotatable end of the main body is provided with an elastic rotation shaft, the elastic rotation shaft comprises a connecting portion and bent portions respectively provided at two sides of the connecting portion, the bent portions are elastically connected to the connecting portion, and each of the bent portions is provided with a respective connecting protrusion.

8. The middle frame assembly according to claim 7, wherein after the main body rotates into the receiving groove under driving of the driving member, a surface of the main body is flush with a surface of the frame.

9. The middle frame assembly according to claim 7, wherein the main body is provided with one of a limiting pin and a limiting slot, and the frame is provided with the other one of the limiting pin and the limiting slot, and
- wherein the limiting pin is slidably connected to the limiting slot to limit a rotation angle of the rotatable end.

10. A terminal device, comprising:
a control unit;
a frame; and
a retractable functional assembly rotatably connected to the frame,
wherein the retractable functional assembly is electrically connected to the control unit of the terminal, and the retractable functional assembly comprises:
a main body comprising a rotatable end and a free end, the rotatable end being rotatably connected to the frame of the terminal, and the free end being configured to rotate into or out of the frame of the terminal;
a camera module provided on the main body and configured to move with the main body; and
a driving member configured to drive the main body to move, wherein when the driving member drives the rotatable end to rotate in such a manner that the free end rotates out of the frame of the terminal, the camera module is exposed from the frame of the terminal, and when the driving member drives the main body to rotate in such a manner that the free end rotates into the frame of the terminal, the camera module is hidden in the frame of the terminal, and
wherein the rotatable end of the main body is provided with an elastic rotation shaft, the elastic rotation shaft comprises a connecting portion and bent portions respectively provided at two sides of the connecting portion, the bent portions are elastically connected to the connecting portion, and each of the bent portions is provided with a respective connecting protrusion.

11. The terminal device according to claim 10, wherein the main body of the retractable functional assembly has an elongated strip shape, and the rotatable end and the free end of the main body are respectively disposed at two ends of the main body in a lengthwise direction.

12. The terminal device according to claim 10, comprising:
- a first guide assembly comprising a protruding rod and a groove, wherein the frame of the terminal is provided with one of the protruding rod and the groove, the retractable functional assembly of the terminal is provided with the other one of the protruding rod and the groove, and the groove slidably cooperates with the protruding rod so that the protruding rod rotates about a center of a circle; and
- a second guide assembly comprising a limiting pin and a limiting slot that are slidably connected to each other, wherein the main body is provided with one of the limiting pin and the limiting slot, the frame is provided with the other one of the limiting pin and the limiting slot, and the limiting pin is slidably connected to the limiting slot to limit a rotation angle of the rotatable end.

* * * * *